United States Patent
Takakusaki et al.

[11] Patent Number: 5,398,826
[45] Date of Patent: Mar. 21, 1995

[54] HIGH-DRAWN AND BLOW-MOLDED POLYESTER BOTTLE

[75] Inventors: Nobuyuki Takakusaki; Yoshitsugu Maruhashi, both of Yokohama; Hiroyuki Hashimoto, Kawasaki; Tomoaki Kaneko, Tokyo, all of Japan

[73] Assignee: Toyo Seikan Kaisha, Ltd., Tokyo, Japan

[21] Appl. No.: 85,144

[22] Filed: Jul. 2, 1993

Related U.S. Application Data

[63] Continuation of Ser. No. 725,085, Jul. 3, 1991, abandoned.

[51] Int. Cl.6 ............................................. B65D 23/00
[52] U.S. Cl. .................................... 215/1 C; 220/602; 220/604; 220/606; 220/608; 220/659; 220/662; 220/675
[58] Field of Search ............... 215/1 C; 220/602, 604, 220/605, 606, 608, 635, 659, 662, 675

[56] References Cited

U.S. PATENT DOCUMENTS

| | | | |
|---|---|---|---|
| 4,233,022 | 11/1980 | Brady et al. | 425/525 |
| 4,387,815 | 6/1983 | Jacobsen | 215/1 C |
| 4,406,854 | 9/1983 | Yoshino | 264/532 |
| 4,485,134 | 11/1984 | Jacobsen | 428/35 |
| 4,566,600 | 1/1986 | Chang | 215/1 C |
| 4,589,559 | 5/1986 | Hayashi et al. | 215/1 C |
| 4,603,066 | 7/1986 | Jabarin | 428/35 |
| 4,618,515 | 10/1986 | Collette | 428/35 |
| 4,649,068 | 3/1987 | Collette | 428/35 |
| 4,991,728 | 2/1991 | Hayashi et al. | 215/1 C |
| 4,991,734 | 2/1991 | Nilsson et al. | 220/604 |

*Primary Examiner*—Allan N. Shoap
*Assistant Examiner*—Stephen Cronin
*Attorney, Agent, or Firm*—Beveridge, DeGrandi, Weilacher & Young

[57] ABSTRACT

A highly-drawn and blow-molded polyester bottle is disclosed have a barrel resin layer forming a bottle wall with a circumferential yield point of higher than 1,800 $kg/cm^2$ and a heightwise yield point of higher than 800 $kg/cm^2$.

2 Claims, 2 Drawing Sheets

Blow Molding Process

HIGH-DRAWN AND BLOW-MOLDED POLYESTER BOTTLE

This application is a continuation of application Ser. No. 07/725,085, filed Jul. 3, 1991, which application is entirely incorporated herein by reference now abandoned.

BACKGROUND OF THE INVENTION

The present invention relates to a highly-drawn and blow-molded polyester bottle having a thin-wall but having no uneven wall-thicknesses and no undesirable whitening appearance. In a further aspect, the present invention relates to a method of manufacturing of these polyester bottles.

Well-known in the art, before the present application, are bottles which have a low yield point and which are obtained by biaxially drawing and blow-molding a preform made of polyethylene terephthalate resin (PET) with the use of a device employing a drawing bar for forcibly drawing the preform in its heightwise, or vertical, direction. For example, Japanese Examined Patent Publication No. 49-3073 discloses a bottle which is biaxially drawn and which is blow-molded from polyethylene terephthalate resin. Japanese Examined Patent Publication No. 58-37895, Japanese Examined Patent Publication No. 61-58288, Japanese Examined Patent Publication No. 61-32978 and Japanese Examined Patent Publication No. 61-56086 concern methods and apparatus for blow-molding with the use of a drawing bar. Japanese Examined Patent Publication No. 62-6970 teaches a method of manufacturing a high-drawn bottle. Japanese Laid-Open (Kokai) Patent No. 64-85733 discloses the crystallization of the bottom of a bottle. However, the manufacture of a bottle which is biaxially drawn and blow-molded using only pressurized fluid in a substantially unconstrained condition has not yet been disclosed in a sufficient manner to make production thereof feasible. Further, there have not yet been described bottles having a high yield point and bottles which are unconstrainedly drawn and molded and in which the wall-thickness of the bottle is substantially uniform except for the port neck section while the ratio of the difference between the wall-thickness of the thickest part and that of the thinnest part to the wall-thickness of the thickest part is less than 50%, and further, wherein the bottle wall other than the part which has been thermally crystallized is highly oriented and crystallized.

Prior known biaxially drawn polyester bottles produced by use of the above-mentioned drawing bar have such disadvantages that they have a low enlargement factor of drawing and many uneven thicknesses. Accordingly, known bottles have been unsatisfactory since they have non-uniform strength and a low strength. The known bottles inevitably have a large wall thickness which increases the occurrence of undesirable whitening or opacity.

SUMMARY OF THE INVENTION

It has now been found that the above-mentioned disadvantages are caused by such facts as the resin layer forming the wall of a bottle cannot be sufficiently drawn, and the necessary strength cannot be obtained since the yield point thereof is low, and that the molding measures heretofore used resulted in problems. Applicants have therefore solved these problems, thereby resulting in successfully providing a lightweight polyester bottle having a thin uniform wall-thickness with no uneven wall-thickness and no whitening in appearance.

Accordingly, it is an object of the present invention to provide a highly-drawn and blow-molded polyester bottle wherein a barrel resin layer forming the bottle wall in the barrel section of the bottle has a circumferential yield point of higher than 1800 $kg/cm^2$ and a heightwise yield point of higher than 800 $kg/cm^2$.

In more detail, the high-drawn and blow-molded polyester bottle of the invention is thermally crystallized at least at the center part of the bottom section. The bottle of the invention has shoulder sections, a barrel section and a bottom section, the center part of which has been thermally crystallized. The shoulder sections, barrel section and bottom, except the center thereof, are highly drawn and blow-molded. The wall thickness of the bottle is uniform, and the ratio of the difference between the wall-thickness of the thickest part of the bottom section excepting the thermally crystallized center part and that of a thinnest part of the barrel section to that of the thickest part is less than 50%, and the entire bottle wall, excepting the port neck section and the center part of the bottom section, is molecularly-oriented and crystallized.

The polyester bottle of the invention has a port neck section and a section between the neck and the shoulder. The center part of the bottom section is thermally crystallized, and the shoulder sections, the barrel section and the bottom section, other than the parts which have been thermally crystallized, are highly drawn and molded.

The part of the bottle above the shoulder sections and below the neck portion is generally a sloping section connecting the neck with the shoulder section and is highly drawn and blow-molded.

When the ratio of the quantity of the resin to the capacity volume of the bottle is from 0.005 to 0.025, no whitening or opacity will be present.

In the bottle of the invention, the wall-thickness measured in the barrel section is thin, that is, 0.2 to 0.3 mm, and no whitening and uneven wall-thickness are present.

The bottles described herein are particularly suitable for carbonated beverages; i.e., liquid drinks containing gas under pressure.

Another feature of the invention resides in a method of manufacturing a highly-drawn and blow-molded polyester bottle, in which a preform molded from polyester is uniformly heated and is blow-molded by introduction of a pressurized fluid into the preform. In carrying out the method, the drawing of the preform is set so as to have a final enlargement factor of diametrical drawing of 4.5 to 5.5, the enlargement factor of diametrical drawing being 1.5 to 1.8 times as large as the enlargement factor of heightwise drawing.

The high-drawing and blow-molding of the preform are carried out by substantially unconstrained blow-molding in which more than 90% of the bottle part maximumly drawn in the diametrical direction is done in an unconstrained condition, i.e. in a freely expanding manner.

In general, the preform used in the invention has a bottom section which is thermally crystallized at least in the center part thereof.

The ratio of difference between the wall-thickness of the thickest part of the bottom section excepting the center part and that of the thinnest part of the barrel section to the wall-thickness of the thickest part is set to less than 50%, and the bottle wall other than the port neck section and the center part of the bottom section is molecularly-oriented and crystallized. In general, the preform has a wall of large thickness. The preform can be initially formed in a conventional manner.

DESCRIPTION OF PREFERRED EMBODIMENTS

Figure 1:
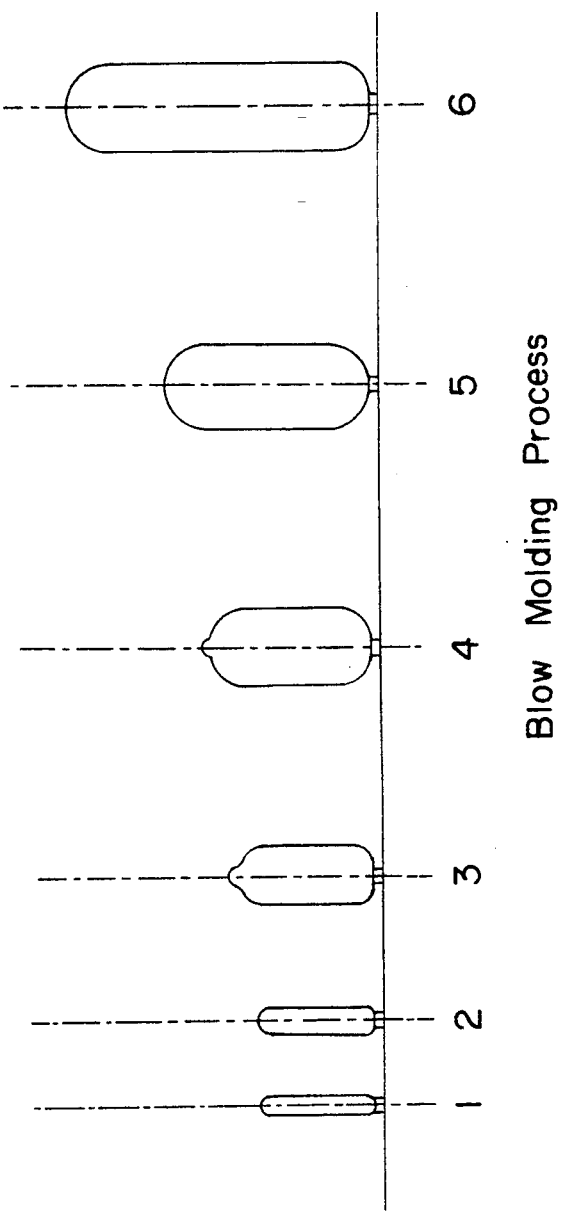
FIG. 1 is a schematic view illustrating the process of molding a bottle according to the present invention by drawing and molding under substantially no constraint.

As mentioned above, in a conventional biaxial drawing and blow-molding process, the drawing and molding in the heightwise direction has been carried out with the use of not only pressurized fluid but also a drawing bar. That is, the heightwise drawing and molding operations have been constrained by the drawing bar, which are not in a substantially unconstrained condition obtainable by use of only pressurized fluid.

The constrained heightwise drawing imparts the influence of the constraint to the circumferential drawing. Further, in the conventional constrained drawing and blow-molding process, the molding has been made by constraining the drawing in the circumferential direction of a bottle with the use of dies. This is because it is required that a bottle have a good external appearance. Accordingly, there has been such a great tendency that efforts are concentrated to improve the external appearance of a bottle while the strength thereof depends upon the thickness of the bottle wall. Thus, the drawing in the circumferential direction of the bottle has not been sufficient.

In contrast to the prior art, in the high-drawing and blow-molding process according to the present invention, a preform is sufficiently drawn and blow-molded by pressurized fluid with substantially no constraint to the drawing of the preform in both circumferential and heightwise directions of a bottle until its completion, thereby molding the bottle.

The drawing and blow-molding process according to the present invention, which is carried out with substantially no constraint, means that more than 90% of the total diametrical greatest drawn section is blow-molded in a substantially unconstrained condition.

Among highly-drawn and blow-molded polyester bottles according to the present invention, there are included a highly-drawn and blow-molded bottle in which at least the center part of the bottom section is thermally crystallized, the shoulder sections, the barrel section and the bottom section excepting the thermally crystallized center part have a bottle wall that is highly drawn and molded, having a uniform thin wall-thickness. According to the invention, the ratio of the difference between the wall-thickness of the thickest part of the bottom section excepting the center part and that of the thinnest part of the barrel section to the wall-thickness of the thickest part is less than 50%, and the bottle walls other than the center part of the bottom section is molecularly-oriented and crystallized.

Such a bottle according to the present invention can be produced by biaxially drawing and blow-molding a preform having a center part of its bottom section which is thermally crystallized, with no constraint, to more than 90% of the diametrical maximum dimension of the barrel section of the bottle. The drawing and molding is carried out by pressurized fluid without constraining any parts other than the port neck section.

The preform used by the present invention, is preferably formed of only thermoplastic polyester such as polyethylene terephthalate or the like, but may include other preforms made of polyester as a main component and blended or laminated with copolymers containing as a main component ethylene-vinyl acetate-copolymeric saponifier, polyvinylidene chloride or similar type resin, acrylonitrile or methacrylonitrile, gas barrier substances such as impermeable copolymeric polymers such as aromatic group nylon, nylon 6, nylon 66, nylon 11 or the like, and preforms made of polyester as a main component and containing a small quantity of a copolymer or a blend of resin such as ethylene glycol isophthalate, benzoic acid, naphthalene-1,4-dicarboxylic acid, naphthalene-2,6-dicarboxylic acid or the like. Hence, the term "polyester preform" as used herein is intended to encompass all of the above and art recognized meanings.

In a constrained drawing and blow-molding process which has been conventionally carried out, the molding is made while hindering the bottle wall from being freely drawn, and accordingly, since the entire drawing is made in such a way that a force is exerted to a part of the bottle wall while not allowing free-drawing, the forces acting upon several parts of the bottle wall are different from each other. Accordingly, those parts upon which large forces act become thinner while those which have small forces acting thereon become thicker. Thus, no uniform drawing can be made.

In comparison, if the drawing is made by use of pressurized fluid with no constraint, uniform force acts upon the entire bottle wall which is therefore similarly drawn. Further, a part having a large wall-thickness, in other words, a part having a large quantity of resin, is greatly drawn so that the wall-thickness becomes uniform,.and can be sufficiently drawn until it is substantially completely shaped.

The mechanism of the unconstrained drawing according to the present invention is completely different from that of the conventional drawing process.

Theoretically, the internal pressure of the bottle supplies two degrees of stress to the cylindrical barrel section in its circumferential directly on as it applies one degree of stress thereto in its heightwise or vertical direction. Further, as understood from the fact that the shoulder sections and the bottom section are substantially spherical, they receive a force which is smaller than that in the circumferential direction but greater than that in the heightwise direction.

Accordingly, in order to increase the strength of the bottle, an increase in the pressure-proof strength of the barrel section of the bottle in it circumferential direction is absolutely necessary, that is, the greater the diametrical pressure-proof strength of the barrel section of the bottle, the thinner the wall of the bottle can become, resulting in a decrease in the quantity of resin needed to make the bottle. In this case, it is important that the wall-thickness be uniform. If it is not uniform, a bottle having a uniform wall-thickness and having a great pressure-proof strength cannot be obtained since the pressure-proof strength of the bottle is determined by the part having the lowest pressure-proof strength.

However, the conventional constrained biaxial drawing and blow-molding process cannot satisfy the above-mentioned demands. As mentioned above, in the conventional drawing and blow-molding process, since the bottle wall is drawn in its entirety by a force exerted upon a part of the bottle wall, the force acting upon the bottle wall cannot be uniform over the entire bottle wall even though several ideas such as that the force is stepwisely increased, and so forth would be made, and accordingly, the force is partly different. Thus, uniform drawing cannot be made, and accordingly, the bottle has nonuniform wall-thickness. Accordingly, it is not possible to obtain a bottle having a uniform wall-thickness and a large pressure-proof strength.

Among the highly-drawn and blow-molded bottles according to the present invention, there is included a bottle having its bottom section which is thermally crystallized. Further, its shoulder sections, its barrel section and its bottom section excepting the center part are highly drawn.

If the high-drawing and blow-molding process with no constraint is made, the bottom section excepting the part which has been thermally crystallized is also molecularly-oriented and crystallized. The bottom section of the bottle has a high possibility of receiving a shock during filling of liquid beverage, physical distribution thereof or the like. Accordingly, it is sometimes demanded that the center part of the bottom section of the bottle is provided with a large wall-thickness part. In order to cope with the above-mentioned demand, should a preform having a thermally crystallized center part of its bottom section be used, in the conventional drawing and blow-molding process, a part around this thermally crystallized zone cannot be sufficiently drawn, resulting in difficulty in molecularly-oriented crystallization. Further, since no thermal crystallization is made, the strength thereof is low. It is to be noted, even with the preform having a bottom section with a thermally crystallized zone in its center part, if it is highly drawn and blow-molded under no constraint, even the part around the thermally crystallized zone is sufficiently drawn, and is also molecularly-oriented and crystallized, having a large mechanical strength with a highly satisfactory pressure-proof ability. Thus, even with a bottle in which the center part of its bottom section is thermally crystallized, if the bottle wall is not sufficiently drawn and molecularly-oriented over the entire bottle, the bottle does not have a higher strength. Accordingly, it is to be understood that it is highly desirable to perform a high-drawing and blow-molding process under no constraint.

Therefore, the present invention is based upon the high-drawing and blow-molding process, and concerns a bottle having its bottom section which is provided at least in its center part with a thermally crystallized zone, and the method of manufacturing thereof. The bottle wall which is continuous to the thermally crystallized zone in the center part of the bottom section, is highly drawn under conditions of no constraint and is blow-molded, and accordingly, is sufficiently drawn and molecularly-oriented.

Since the port neck section is not drawn, the thermal resistance thereof is enhanced if it is thermally crystallized. Thus, although the port neck section can be thermally crystallized, no thermal crystallization is required in the case where it is not used for contents which are not heated after being filled therein. This is because the port neck section has a large wall-thickness with a high strength.

With the high-drawing and blow-molding process according to the present invention, it is most preferable that more than 90% of the diametric greatest drawn section is blow-molded under no constraint with the use of pressurized fluid, or in particular high pressure fluid. If more than 90% is highly drawn and blow-molded under no constraint, excepting the port neck section and the center part of the bottom section which are not drawn even in the heightwise direction, a very excellent bottle is molded. Therefore, it is preferable to blow-mold a bottle in a no-constraint condition until the time of making contact with blowing dies so as to obtain the final shape of the bottle.

It is most preferable to blow-mold the bottle under no constraint until the bottle is completed, If the bottle is highly drawn and blow-molded under no constraint, the shape of the bottle approaches a spherical shape although it depends upon the shape of its preform. Since bottles have their respective required external shapes, each bottle can be set in an external shape by being constrained by dies at a final finishing step. However, in the present invention, it is necessary that the high-drawing and molding of the bottle wall under no constraint is made for at least more than 90% of the diametric greatest drawn part of the barrel section of the molded bottle. Further, it is highly preferable to carry out more than 90% of the heightwise drawing thereof under no constraint, that is, to carry out 90% of the whole drawing and molding process under no constraint.

Thus, a highly-drawn and blow-molded bottle having a bottle wall with a very high yield point can be formed by a high-drawing and blow-molding process under substantially no constraint.

Accordingly, with the high-drawing and blow-molding process under substantially no constraint, the thickness of the bottle wall becomes substantially uniform, and the ratio of the difference between the wall-thickness of the thickest part of the bottom section excepting a thermal crystallization center part and that of a thinnest part of the barrel section to the wall-thickness of the thick part becomes less than 50%. As a result, it is possible to remarkably enhance the characteristics of the bottle wall. Should the ratio of the difference between the wall-thickness of the thick part and that of the thin part to the wall-thickness of the thick part exceed 50%, the bottom wall cannot always be uniform, and accordingly, the bottle has poor characteristics. Further, by performing a high-drawing and blow-molding process under no constraint with the use of polyethylene terephatalate, a highly-drawn and blow-molded bottle comprising a barrel section resin layer having a circumferential yield point of higher than 1800 kg/cm$^2$ and a heightwise yield point of lower than 800 kg/cm$^2$ can be formed.

Accordingly, it is preferable to previously design the shape of a preform so that more than 90% of the diametrically greatest drawn section is blow-molded under no constraint; freely expanding, before the resulting freely expanded preform makes close contact with the blowing dies for completion of the final bottle.

It is preferable to draw and blow-mold a bottle under substantially no constraint in the diametrical and heightwise direction of the barrel section which has applied thereto the highest pressure.

At the same time, if the shoulder sections of the bottle have a specific shape depending upon an intended use purpose, they may be shaped by being placed into contact with blowing dies. Since the internal pressure applied to the shoulder sections is small in comparison with the barrel section, even though it is formed with a more or less constrained condition so as to have a low degree of drawing and a low yield point, the influence upon the bottle is less.

However, it is desirable to draw the shoulder sections under as little constraint as possible, and it is necessary to highly draw each of the shoulder sections at least in a part of the bottle which is below the connection portion along which the bottle is gradually widened from the neck section to the shoulder section.

The bottle having such a resin layer bottle wall which is drawn with a uniform thickness is a novel bottle formed of a bottle wall in which the ratio of the difference between the wall-thickness of the thickest part and that of the thinnest part to the wall-thickness of the thickest part is less than 50% and which is highly molecularly-oriented and crystallized. Such a bottle has never been known before the Applicants invention. Further, as the yield point of a conventional bottle is only about 500 $kg/cm^2$ at most, it is understood that the bottle according to the present invention is formed of a special resin layer bottle wall having an extremely high yield point.

The yield point as the term is used in the present invention means the value of stress at which permanent deformation abruptly increase as the stress value gradually increases in the process of deformation by applying stress to the wall of the bottle. In the present invention, Tensilon UTM-III-100 produced by Toyo Baldwin Co. was used as a testing machine while the test piece was obtained by punching the barrel section of the bottle in its heightwise and circumferential directions by use of a punch blade having a shape which meets the standard of JISK 7113 or ASTMD 638 being tested at a speed 10 mm/min so as to obtain a yield point.

Accordingly, it is understood that the higher the yield point, the larger the stress which imparts a permanent deformation. That is, higher yield means a larger mechanical strength. With this bottle, it is proved that a deformation caused by an expansion caused by the internal pressure held therein is difficult to occur.

According to the present invention, the circumferential yield point of the barrel section resin layer of the wall of a polyester bottle which is subjected to the highest stress caused by the internal pressure thereof should be greater than 1800 $kg/cm^2$. If it is below this value, the strength becomes too low so that the wall-thickness cannot be decreased. Further, the heightwise yield point should be greater than 800 $kg/cm^2$ although the stress exerted in the heightwise direction is one half of that in the circumferential direction. If it is below this value, the strength becomes too low, and accordingly, the wall-thickness cannot be decreased. The reason why the above-mentioned advantages cannot be given if the yield point is out of this range will be explained specifically with regard to the following examples and comparison examples.

In the bottle according to the present invention, the ratio of the quantity of resin in a molecularly oriented part to the content/capacity volume is preferably in a range of 0.005 to 0.025, and the wall-thickness measured in the barrel section is preferable in a range of 0.2 to 0.3 mm in view of the oxygen barrier ability and the shape stability. If it is outside of this range, the permeation of oxygen tends to be large. Further, during filling of the content, or particulary during holding of the contents, it has been found that the bottle tends to be deformed by the weight of the contents and the above-mentioned range gives a satisfactory result.

In the high-drawing and blow-molding process according to the present invention, the radial enlargement factor of drawing is from 4.5 to 5.5, which is 1.5 to 1.8 times as large as the heightwise enlargement factor of drawing. Molding outside of this range causes the occurrence of undesired whitening of a bottle and uneven wall-thickness, and therefore is not preferred. The reason why the above-mentioned advantages cannot be obtained when the enlargement factor is outside of this range will be explained specifically in the following examples and comparison examples.

In the high-drawing and blow-molding process according to the present invention, it is most preferable that more than 90% of the diametric greatest drawn section is blow-molded under a unconstrained condition with the use of pressurized fluid or in particular high pressure fluid. The blow-molding process under the unconstrained condition within this range can attain precisely the above-mentioned enlargement factor of drawing, and accordingly, a bottle having the above-mentioned yield point can be obtained.

Additional explanation of the high-drawing and blow-molding process under substantially no constraint, according to the present invention, should be made such that the barrel section of the bottle upon which the highest stress is exerted and the heightwise direction thereof are drawn and blow-molded desirably under conditions of substantially no constraint.

As one of the features of the present invention, when the high-drawing and blow-molding process is carried out under substantially no constraint with the use of pressurized fluid, a preform is drawn at first, diametrically, irrespective of temperature, pressure and wall-thickness. The diametrical enlargement factor of drawing is 4.5 to 5.5. In comparison with the conventional biaxial drawing process in which the diametrical enlargement factor of drawing is 4.2 at most, it is understandable that the high-drawing and blow-molding under substantially no constraint with the use of pressurized fluid exhibits an extremely satisfactory result in the drawing process. With the enlargement factor of drawing in this range, it is possible to prevent whitening and uneven wall-thickness of a bottle. Further, as mentioned above, the yield point is very high.

As used herein, the term "no constraint" means without contacting the surface of the blow-mold dies; i.e. freely expanding.

When the above-mentioned diametric drawing reaches substantially the above-mentioned range i.e. 4.5 to 5.5, the heightwise drawing is promoted, and the drawing in this heightwise direction is also made by a high-drawing and blow-molding process under substantially no constraint with the use of pressurized fluid. The diametrical enlargement factor of drawing is 1.5 to 1.8 times as large as the heightwise enlargement factor of drawing. When the heightwise drawing reaches substantially the above-mentioned range, the bottle abuts against dies which have been previously designed in accordance with the desired configuration. The heightwise enlargement factor of drawing within this range can prevent whitening and uneven wall-thickness of the bottle.

If it is desirable that the position of the center of the bottom section of the thus obtained bottle be maintained constant, the center of the bottom section of the bottle can be placed into contact with and be fixed to the center of the bottom section of the blowing dies by using, for example, a center fixture which is set in the bottle which is formed in the final step. However, if it is not necessary that the position of the center of the bottom section is precisely maintained constant as mentioned above, the step of aligning the centers with each other is not required. Since, due to uneven wall-thickness of a preform and due to non-uniform temperature, the enlargement factor of drawing varies at that part, and the center of the bottle to be molded is off to one side, resulting in deterioration of its external appearance, a center adjusting tool is sometimes used for contact with the center so as to prevent the center from being off to one side.

However, the circumferential drawing under substantially no constraint can realize a high-drawing and blow-molding process in the heightwise direction if substantial drawing is made with the use of blowing fluid even though the center adjusting tool is more or less placed into contact with the bottom section of the preform during the blow-molding step. The present invention also includes this variation.

It is clear that such a drawing and blow-molding process under substantially no constraint with the use of pressurized fluid has an enlargement factor of drawing which is greatly different from that of the conventional biaxial drawing process. However, for the sake of convenient understanding, it is to be noted that the highly-drawn and blow-molded bottle according to the present invention has an enlargement factor of surface-drawing of 12 to 20 which gives a very high-drawing having a high rate of 20 to 100% in comparison with the conventional biaxial-drawn and molded bottle having an enlargement factor of surface-drawing of about 10 at most. Accordingly, the yield point becomes high, and the strength of the bottle also becomes very large. Further, when a bottle having a contents volume of 1,500 ml which was produced with the use of 50 g of polyester in a conventional process is compared with a bottle having the same shape with the use of 37 g of polyester, according to the present invention, the bottle according to the present invention exhibits a mechanical strength which is equal to or greater than that of the conventional bottle even though only 74% of the quantity of resin is use.

It is to be noted that the enlargement factor of surface-drawing is given by the product of the diametric enlargement factor of drawing and the heightwise enlargement factor of drawing.

The highly-drawn and blow-molded polyester bottle according to the present invention is a novel high-strength high-drawn bottle in which the resin layer of the barrel section of the bottle wall has a circumferential yield point of greater than 1800 kg/cm$^2$ and the heightwise yield point of greater than 800 kg/cm$^2$, and gives remarkable and excellent advantages which cannot be predicted from the conventional bottles.

The second feature of the present invention is such that the wall-thickness of the drawn and molded bottle wall is uniform, except its port neck section.

The third feature of the present invention resides that the ratio of the difference between the wall-thickness of the thickest part of the bottle wall except the port neck section and the thermally crystallized part of the bottom section, and that of a thinnest part thereof to the wall-thickness of the thickest part is less than 50%.

If the difference in the wall-thickness exceeds 50%, the pressure-proof strength becomes irregular, resulting in such a defect that the shape of the bottle is warped.

The fourth feature of the present invention resides in that the bottle wall other than the port neck section and the thermally crystallized center part of the bottom section is molecularly-oriented and crystallized in its entirety.

With the above-mentioned features, the bottle is formed of a thin bottle wall having a uniform wall-thickness and high molecular-orientation, and is light-weight while having a high strength, and in particular, it has excellent pressure-proof strength so as to give such an advantage that it can be very convenient for handling during the filling stage with the contents and during the physical distribution stage.

The fifth feature of the present invention is the provision of a thermally crystallization zone in the center part of the bottom section. This zone has a large thick-wall so as to give such an advantage that it withstand shock suffered during handling.

Further, the fifth feature of the present invention is such that the gas barrier ability of the bottle wall is also excellent, and in particular the permeability to oxygen is low. With this feature, it is possible to prevent spoilage of the contents caused by oxygen and any occurrence of degassing from the content.

Applicants have considered that such an improvement in the gas barrier ability is due to the molecular-orientation and crystallization progressing as the molecular-orientation increases, and accordingly, the degree of the crystallization increases.

If the preform is heated at both inside and outside thereof when it is highly drawn and molded under substantially no constraint, uniform heating can be obtained which is extremely desirable and effective in a high-drawing and blow-moving process. The reason is as follows:

In order to enhance the strength of the bottle according to the present invention, the enlargement factor of the drawing is set to be high, and accordingly, the wall-thickness of the preform becomes larger. Thus, the usual heating, that is, heating only at the inside lowers the temperature, and accordingly, sufficient drawing cannot be made, or uneven wall-thickness and whitening is obtained, resulting in such a tendency that a satisfactory bottle cannot be obtained.

The bottle according to the present invention has a high yield point, and is excellent in the pressure proof strength, and accordingly, it is preferably for use as containers for beverages containing gas under pressure.

The present invention will be further understood with reference to the drawings.

FIG. 1 is an schematic view illustrating the stages in which the bottle is molded by the present invention.

Thus, it is shown that a polyester preform 1 is heated both inside and outside up to a drawing temperature and is molded into a bottle in a high-drawing and blow-molding process under substantially no constraint by the sequential steps of (1) to (6); to wit:

(1) indicates the condition at the start;
(2) indicates the condition after elapse of 0.2 seconds;
(3) indicates the condition after elapse of 0.3 seconds, in which it expands mainly in a diametrical direction;

(4) indicates the condition after elapse of 0.4 to 0.5 seconds. The expansion in the diametrical direction is substantially stopped, but the expansion in the heightwise direction is not yet completed, substantially. In the conventional biaxial-drawing and molding process with the use of a drawing bar, the heightwise drawing is carried out in parallel with the use of the drawing bar before this stage. It is to be understood that according to the present invention, the diametrical drawing is at first made, and in this stage the expansion of the diameter of the bottle is substantially complete. However, the heightwise drawing and vertically expansion is not yet made substantially;

(5) indicates the condition after 0.6 seconds elapsing. No diametrical drawing is made, but the heightwise drawing is made;

(6) indicates the condition after 0.8 seconds elapsing. The heightwise drawing is stopped, and no drawing is made in both diametrical and heightwise directions.

Figure 2:
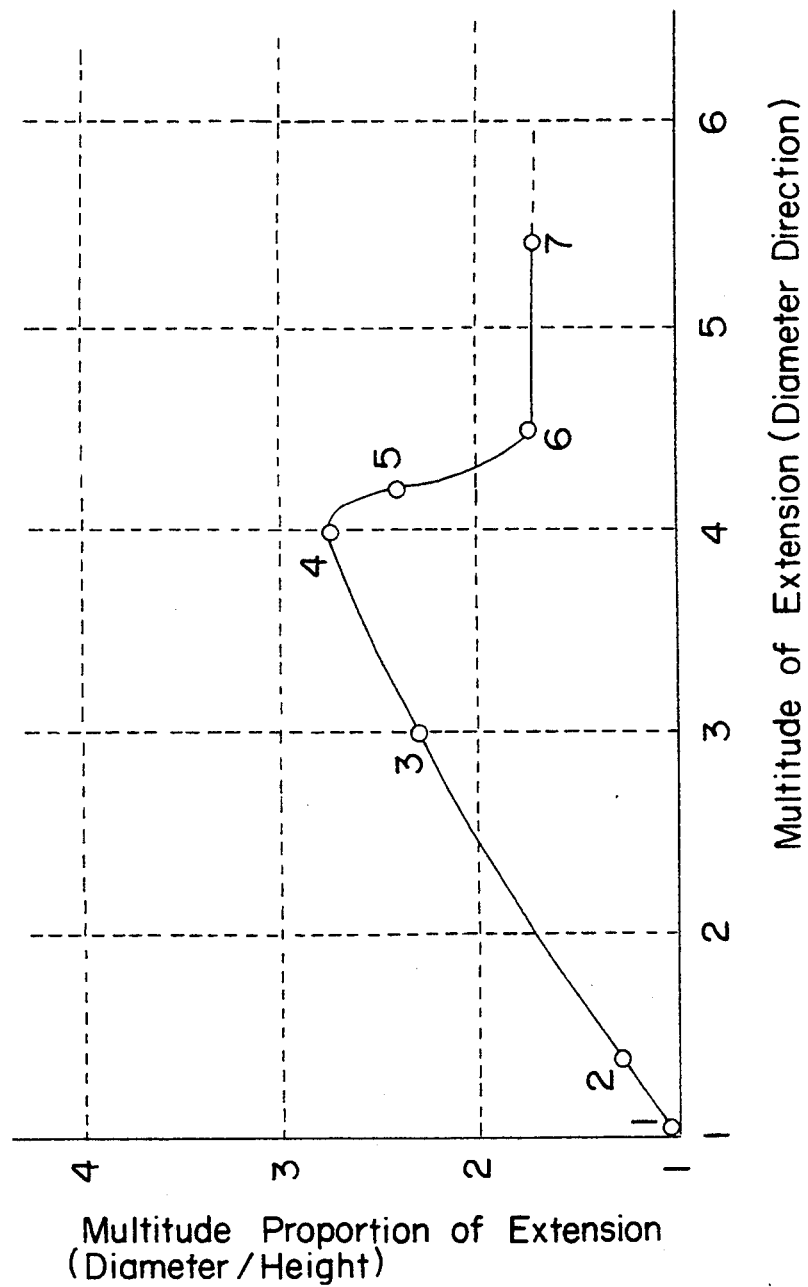
FIG. 2 is a graph showing the relationship between the diametric enlargement factor of drawing and the ratio between the diametric enlargement factor of drawing to the heightwise enlargement factor of drawing in a blow-molding process.

FIG. 2 shows the relationship between the diametrical enlargement factor of drawing and the ratio of the diametric enlargement factor of drawing to the heightwise enlargement factor of drawing. Explanation will be made with the use of reference numerals attached to the curve. That is, in this figure, in the zones 4 to 5 in which the diametrical enlargement factor of drawing is low, the wall thickness becomes uneven, and with the zones above 7, which are indicated by dotted lines, whitening occurs. The bottles according to the present invention is a satisfactory polyester bottle which is molded with the zones 6 to 7 so as to have a uniform wall-thickness with no whitening.

Reference numerals 1 to 6 in FIG. 2 denote zones which correspond to reference numerals 1 to 6 in FIG. 2, respectively.

The following explains the technical effects and advantages given by the present invention in consideration with reference examples among which examples 1 to 2 concern bottles each having its bottom whose center part is not thermally crystallized while examples 3 to 4 concern bottles each having its bottle whose center part is thermally crystallized.

EXAMPLE 1

A thick wall preform formed of polyester and having a wall-thickness of 4.6 mm and a resin quantity of 37 g, was heated uniformly up to a temperature of 105° C. at both inside and outside thereof, and was highly drawn and blow-molded under substantially no constraint under the conditions shown in Table 1 so as to produce a bottle having a contents volume of 1,500 ml.

EXAMPLE 2

A thick wall preform formed of polyester and having a wall-thickness of 4.7 mm and a resin quantity of 37 g was heated uniformly up to a temperature of 105° C. at both inside and outside thereof under the conditions shown in Table 1 so as to produce a bottle having an average wall-thickness of 0.29 mm and an contents volume 1,500 ml.

Comparative Example 1

A thin wall preform formed of polyester and having a wall-thickness of 4.2 mm and a resin quantity of 50 g was biaxially drawn under the conditions shown in Table 1, with the use of a drawing bar so as to produce a bottle having a contents volume of 1,500 ml.

Comparative Example 2

A thin wall preform formed of polyester and having a wall-thickness of 4.3 mm and a resin quantity of 50 g was used under the conditions shown in Table 1 so as to produce a bottle having a contents volume of 1,500 ml.

Comparative Example 3

A thin wall preform formed of polyester and having a wall-thickness of 4.3 mm and a resin quantity of 37 g was used under the conditions shown in Table 1 so as to produce a bottle having an average wall-thickness of 0.27 mm and a contents volume of 1,500 ml. However, in this bottle, whitening occurred in the barrel section so that this bottle did not exhibit the necessary product quality. This comparative example is not simply a conventional example, but the one for comparison which was formed merely with a resin quantity that is equal to that of example 1.

EXAMPLE 3

A thick wall preform made of polyethylene terephthalate and having a wall-thickness of 4.6 mm with a resin quantity of 37 g, in which the center part of the bottom section thereof is thermally crystallized was used and was uniformly heated at both inside and outside thereof up to a temperature of 110° C. so as to produce a bottle having a contents volume of 1,500 ml by a high-drawing and blow-molding process under substantially no constraint under the conditions shown in Table 3.

EXAMPLE 4

A thick wall preform made of polyethylene terephthalate and having a wall-thickness of 4.7 mm with a resin quantity of 39.5 g, in which the center part of the bottom section and the neck portion thereof is thermally crystallized was used and was uniformly heated at both inside and outside thereof up to a temperature of 105° C. so as to produce a bottle having a contents volume of 1,500 ml by a high-drawing and blow-molding process under substantially no constraint under the conditions shown in Table 3.

Comparative Example 4

A thin wall preform made of polyethylene terephthalate and having a wall-thickness of 4.2 mm with a resin quantity of 50 g, was used so as to produce a bottle having a contents volume of 1,500 ml by a bi-axial drawing process using a drawing bar under the conditions shown in Table 3.

Table 4 shows the characteristics of the bottles in example 3 and comparative example 4.

(1) A high-drawn and blow-molded polyester bottle having a resin layer in the barrel section which constitutes the bottle wall according to the present invention, as mentioned above, having a circumferential yield point of greater than 1,800 kg/cm$^2$ and a heightwise yield point of greater than 800 kg/cm$^2$, has an extremely satisfactory strength, and accordingly, the quantity of resin to be used can be greatly reduced.

(2) If the coefficient PO$_2$ of oxygen permeability is small, the value of oxygen permeability can be made to be equal to or less than that of the conventional bottle even though the wall-thickness is made to be small. In view of this point, it is understood that the bottle made according to the present invention can reduce the quantity of resin.

(3) It is clear that if the yield points are out of the above-mentioned ranges, uneven wall-thickness and whitening occur.

(4) It is understood that when that drawing of the preform is made with a diametrical enlargement factor of drawing of 4.5 to 5.5, and a heightwise enlargement factor of drawing of 1.5 to 1.8, a high-drawn and blow-molded bottle having a barrel section resin layer whose circumferential yield point is greater than 1800 kg/cm$^2$ and whose heightwise yield point is greater than 800 kg/cm$^2$, and be obtained. However, if the enlargement factor of drawing is outside of the above-mentioned ranges uneven wall-thickness and whitening occur.

(5) A high-drawn and blow-molded bottle having a uniform wall-thickness with a high degree of molecular-oriented crystallization of the bottle wall which constitutes the bottle according to the present invention has an extremely satisfactory strength, and accordingly can reduce the quantity of resin used.

As mentioned above, the present invention provides a bottle having a high yield point, a high enlargement factor of drawing, and a high strength while having no whitening and being excellent in the gas barrier ability by use of the high-drawing and blow-molding process under substantially no constraint. Further, the bottle according to the present invention has its barrel section which is exerted with a highest internal pressure and which is excellent in pressure proof strength, and is particularly excellent in the pressure proof strength at high temperatures, and in heat-resistance stability, and accordingly, it is well suited for packaging beverages containing gas under pressure, such as carbonated soft drinks.

TABLE 1

|  | example 1 | example 2 | comparative example 1 | comparative example 2 | comparative example 3 |
| --- | --- | --- | --- | --- | --- |
| material | J125*[1] | 9921W*[2] | J125 | J125 | J125 |
| resin quantity (g) | 37 | 37 | 50 | 50 | 37 |
| contents volume (ml) | 1500 | 1500 | 1500 | 1500 | 1500 |
| $\frac{\text{resin quantity(g)}*[3]}{\text{contents volume(ml)}}$ | 0.020 | 0.020 | 0.029 | 0.029 | 0.020 |
| magnification factor of drawing |  |  |  |  |  |
| diametric direction | 5.0 | 5.3 | 4.3 | 4.0 | 5.6 |
| heightwise direction | 3.0 | 3.0 | 2.3 | 2.8 | 3.3 |
| ratio of magnification factor of drawing | 1.67 | 1.77 | 1.87 | 1.43 | 1.09 |
| unconstrained drawing (%) | 95 | 96 | 80 | 75 | 105 |
| wall-thickness (mm)*[4] | 0.29 | 0.29 | 0.38 | 0.35 | 0.27 |
| blow pressure (kg/cm$^2$) | 30 | 30 | 30 | 30 | 30 |

NOTE:
*[1]: Polyester resin made by Mitsui Petroleum Chemical Co., Ltd.;
*[2]: Polyester resin made by Kodak;
*[3]: Values obtained by subtracting 7 g weight of the port neck section;
*[4]: Averaged values of values at four circumferential positions of the bottle barrel sections of ten bottles.

TABLE 2

|  | example 1 | example 2 | comparative example 1 | comparative example 2 | comparative example 3 |
| --- | --- | --- | --- | --- | --- |
| yield point (kg/cm2)*[5] |  |  |  |  |  |
| circumferential direction | 2180 | 2210 | 1700 | 1670 | 1690 |
| heightwise direction | 940 | 910 | 860 | 1000 | 750 |
| degree of crystallization (%)*[6] | 29.8 | 28.7 | 25.1 | 26.0 | —*[7] |
| maximum wall-thickness (mm) | 0.39 | 0.39 | 1.88 | 1.90 | 0.50 |
| minimum wall-thickness (mm) | 0.29 | 0.28 | 0.34 | 0.35 | 0.27 |
| rate of uneven wall-thickness (%)*[8] | 25.6 | 28.2 | 81.9 | 81.6 | 46.0 |
| oxygen permeability*[9] (cc/cm$^2$.day.atm) | 4.4 | 4.6 | 4.1 | 4.5 | — |
| coefficient of oxygen permeability*[10] (cc.cm/cm$^2$.sec.cmHg) | $1.9 \times 10^{-12}$ | $2.0 \times 10^{-12}$ | $2.4 \times 10^{-2}$ | $2.4 \times 10^{-12}$ | — |
| variation rate (%)*[11] |  |  |  |  |  |
| diametric direction | +0.61 | — | +0.62 | — | — |

TABLE 2-continued

| | example 1 | example 2 | comparative example 1 | comparative example 2 | comparative example 3 |
|---|---|---|---|---|---|
| heightwise direction | +0.72 | — | +0.71 | — | — |

NOTE:
*5: Tensilon UTM-III-100 produced by Toyo Baldwin Co. was used as a testing machine, and a test piece which was obtained by punching the barrel section of the bottle in the heightwise and circumferential directions with the use of a punch blade having a shape which meets the standard of JIS K 7113 or ASTMD 638 was tested at a rate of 10 mm/min so as to obtain yield point:
$\sigma = F/A$
wherein:
$\sigma$: yield point
F: load
A: original averaged sectional area of a parallel part of a test piece.
*6: A density gradient pipe of N-heptan-carbon tetrachloride group (Ikeda Rika Co., Ltd.) was manufactured, and a density of a sample was measured under conditions at 20° C., and the degree of crystallization was calculated in accordance with the following equation:

$$Xc \frac{Pc \times (P - Pa)}{P \times (Pc - Pa)} \times 100$$

wherein:
Xc: calculated degree of crystallization
P: density (g/cm$^3$)
Pa: noncrystallized density (1.335 g/cm$^3$)
Pc: saturate crystallized density (1.455 g/cm$^3$)
*7: Voids were produced, and accordingly, no satisfactory product was obtained;
*8: Ratio of a difference between the wall-thickness of a thickest part in a molecular-oriented section and that of a thinnest part to the wall-thickness of the thickest part;
*9: With use of cut out bottle barrel section wall, the oxygen permeability QO$_2$ (cc/cm$^3$.day.atm) of the bottle wall was measured under the condition of a temperature of 25° C., and 100% RH with the use of Oxytran-100 (Moder Control Co.);
*10: The oxygen permeability coefficient PO$_2$ (cc.cm/cm$^2$.sec.cmHg) of the battle barrel section wall per unit area was calculated from the oxygen permeability;
*11: An empty bottle after more then 24 hours elapsing from the end of its molding was used, and carbonate water was filled up to a filling indication line, and was closed by a cap. The bottle was left for 24 hours. Then, the diameter of the barrel section of the bottle was measured, and further, the same was measured again after being held for 24 hours at 38° C. so as to evaluate the pressure proof ability from the variation rate thereof.

TABLE 3

| | Example 3 | Example 4 | Comparative Example 4 |
|---|---|---|---|
| material | J125*$^1$ | J125 | J125 |
| resin quantity (g) | 37 | 39.5 | 50 |
| inside volume (ml) | 1500 | 1500 | 1500 |
| $\frac{\text{resin quantity(g)}*^3}{\text{contents volume(ml)}}$ | 0.019 | 0.021 | 0.028 |
| magnification factor of drawing | | | |
| diametric direction | 5.0 | 4.7 | 4.3 |
| heightwise direction | 3.0 | 2.9 | 2.3 |
| ratio of magnification factor of drawing | 1.67 | 1.62 | 1.87 |
| unconstrained drawing (%) | 95 | 92 | 81 |
| wall-thickness (mm)*$^3$ | 0.29 | 0.31 | 0.38 |
| blow pressure (kg/cm$^2$) | 30 | 30 | 30 |

NOTE:
*12: A value obtained by subtracting a weight of 8 g of the port neck section and the thermally crystallized part of the bottom section.
Note:
*1 to *3 are those stated in Table 1.

TABLE 4

| | Example 3 | Example 4 | Comparative Example 4 |
|---|---|---|---|
| yield point (kg/cm$^2$)*$^5$ | | | |
| circumferential direction | 2180 | 1950 | 1700 |
| heightwise direction | 940 | 930 | 860 |
| degree of crystallization (%)*$^6$ | 29.8 | 28.7 | 25.1 |
| maximum wall-thickness (mm) | 0.40 | 0.42 | 1.87 |
| minimum wall-thickness (mm) | 0.29 | 0.30 | 0.34 |
| $\frac{\text{maximum wall-thickness} - \text{minimum wall-thickness}}{\text{maximum wall-thickness}} \times 100$ | 27.5 | 28.6 | 81.8 |
| degree of oxygen permeability*$^9$ (cc/cm$^2$.day.atm) | 4.4 | 4.6 | 4.1 |
| coefficient of oxygen permeability*$^{10}$ (cc.cm/ cm$^2$.sec.cmHg) | 1.9 × 10$^{-12}$ | 2.0 × 10$^{-12}$ | 2.4 × 10$^{-12}$ |
| variation rate (%)*$^{11}$ | | | |
| diametric direction | +0.61 | +0.60 | +0.62 |
| heightwise direction | +0.72 | +0.71 | +0.71 |
| drop-proof strength (number of bottles)*$^{13}$ | 0 | 0 | 0 |
| burst-proof strength (kg/cm$^2$)*$^{14}$ | 16.5 | 16.0 | 15.0 |
| stress upon bursting (kg/cm$^2$)*$^{15}$ | 2650 | 2570 | 1890 |

NOTE:
*5 to *12 are those stated in Table 2.
$\sigma = \frac{P \times r}{t}$

*13: A regulated quantity (1,500 ml) of carbonate water 4 gas volume was filled and sealed in a bottle and was then held at 5° C. for a week, and thereafter they were dropped onto a concrete pavement from a height of 2 m for evaluation (n = 10);
*14: Air pressure at which a bottle was burst by air blown into a bottle;
*15: A stress was obtained by where
P: strength upon bursting
r: radius
t: wall-thickness.
Incidentally, the thickness t is 0.29 mm with bottles according to the present invention, and is 0.37 mm with bottles in comparative examples, and further, a radius is 46.5 mm in all cases.

What we claim is:
1. A high-drawn and blow-molded polyester bottle wherein a barrel resin layer forming a bottle wall has a circumferential yield point of higher than 1800 kg/cm$^2$ and a heightwise yield point of higher than 800 kg/cm$^2$ made by providing a preform molded from polyester, uniformly heating said preform, substantially unconstrainedly blow-molding said preform by injecting a pressurized fluid into said preform, drawing the preform so as to have an enlargement factor of diametrical drawing of 4.5 to 5.5, the enlargement factor of the diameter being 1.5 to 1.8 times as large as the enlargement factor of heightwise drawing.

2. A high-drawn and blow-molded polyester bottle having a neck section, a shoulder section, a barrel section and a bottom section which are continuously formed with a bottle wall, wherein at least a center part of the bottom section is thermally crystallized, the shoulder section, the barrel section and the bottom section excepting the center part which has been thermally crystallized, are highly drawn and blow-molded, the wall thickness being uniform, and a ratio of a difference between a wall-thickness of a thickest part of said bottom section excepting the center part of the bottom which has been thermally crystallized, and a thinnest part of said barrel section to that of said thickest part is less than 50%, and the entire bottle wall, excepting the port neck section and the center part of the bottom section, is molecularly-oriented and crystallized, made by providing a preform molded from polyester, uniformly heating said preform, substantially unconstrainedly blow-molding said preform by injecting a pressurized fluid into said preform, drawing the preform so as to have an enlargement factor of diametrical drawing of 4.5 to 5.5, the enlargement factor of the diameter being 1.5 to 1.8 times as large as the enlargement factor of heightwise drawing.

* * * * *